US010621274B2

(12) United States Patent
Weskamp et al.

(10) Patent No.: US 10,621,274 B2
(45) Date of Patent: Apr. 14, 2020

(54) DYNAMIC ARRANGEMENT OF CONTENT PRESENTED WHILE A CLIENT DEVICE IS IN A LOCKED STATE

(71) Applicant: Flipboard, Inc., Palo Alto, CA (US)

(72) Inventors: Marcos Weskamp, Palo Alto, CA (US); Johan Prag, Mountain View, CA (US); Eric Alexander, North Miami Beach, FL (US); Eric Feng, Menlo Park, CA (US)

(73) Assignee: Flipboard, Inc., Redwood City, CA (US)

( * ) Notice: Subject to any disclaimer, the term of this patent is extended or adjusted under 35 U.S.C. 154(b) by 367 days.

(21) Appl. No.: 14/286,892

(22) Filed: May 23, 2014

(65) Prior Publication Data

US 2014/0351268 A1 Nov. 27, 2014

Related U.S. Application Data

(60) Provisional application No. 61/826,944, filed on May 23, 2013.

(51) Int. Cl.
*G06F 17/21* (2006.01)
*G06F 16/2457* (2019.01)
(Continued)

(52) U.S. Cl.
CPC .......... *G06F 17/217* (2013.01); *G06F 3/0488* (2013.01); *G06F 16/24578* (2019.01); *G06F 17/248* (2013.01)

(58) Field of Classification Search
None
See application file for complete search history.

(56) References Cited

U.S. PATENT DOCUMENTS 6,724,403 B1 * 4/2004 Santoro .................... G09G 5/14
715/765
6,771,801 B1 8/2004 Fisher et al.
(Continued)

FOREIGN PATENT DOCUMENTS

CN 102693079 A 9/2012

OTHER PUBLICATIONS

United States Office Action for U.S. Appl. No. 13/187,840, dated Feb. 13, 2013, 23 pages.
(Continued)

*Primary Examiner* — Usmaan Saeed
*Assistant Examiner* — Yu Zhao
(74) *Attorney, Agent, or Firm* — Fenwick & West LLP

(57) ABSTRACT

A client device selects content items associated with various applications executing on the client device and dynamically lays out the selected content items for presentation while the client device is in a locked state. To present the selected content items, the client device selects a page template including slots specifying sizing and relative positioning of content items based on user attributes, geographic information, client device characteristics, and content item attributes. Content items associated with various applications are associated with each slot in the selected page template, and when the client device is in a locked state, the content items are presented with relative sizing and positioning determined by the slots in the selected page template.

16 Claims, 5 Drawing Sheets

(51) Int. Cl.
  *G06F 17/24* (2006.01)
  *G06F 3/0488* (2013.01)
  *G06F 3/0487* (2013.01)

(56) References Cited

U.S. PATENT DOCUMENTS

| | | | |
|---|---|---|---|
| 6,826,727 | B1 | 11/2004 | Mohr et al. |
| 7,028,255 | B1 | 4/2006 | Ayers |
| 7,272,789 | B2 | 9/2007 | O'Brien |
| 7,747,947 | B2 | 6/2010 | Balinsky |
| 7,814,116 | B2 | 10/2010 | Hauser |
| 8,060,830 | B2 | 11/2011 | Kahn et al. |
| 2003/0101060 | A1 | 5/2003 | Bickley et al. |
| 2004/0078759 | A1 | 4/2004 | Ohashi et al. |
| 2004/0252340 | A1 | 12/2004 | Komagamine et al. |
| 2005/0055635 | A1 | 3/2005 | Bargeron et al. |
| 2005/0268279 | A1 | 12/2005 | Paulsen et al. |
| 2006/0080321 | A1* | 4/2006 | Horn .................. G06F 17/30867 |
| 2006/0107204 | A1 | 5/2006 | Epstein |
| 2006/0168514 | A1 | 7/2006 | Tokunaga |
| 2006/0279555 | A1 | 12/2006 | Ono |
| 2007/0214409 | A1 | 9/2007 | Miyata |
| 2007/0255811 | A1 | 11/2007 | Pettit et al. |
| 2007/0294238 | A1 | 12/2007 | Citron et al. |
| 2008/0085724 | A1* | 4/2008 | Cormier .................. H04L 67/18 455/456.1 |
| 2008/0085725 | A1 | 4/2008 | Grayson et al. |
| 2008/0189609 | A1 | 8/2008 | Larson et al. |
| 2009/0249177 | A1 | 10/2009 | Yamaji et al. |
| 2009/0307583 | A1 | 12/2009 | Tonisson |
| 2010/0005380 | A1 | 1/2010 | Lanahan et al. |
| 2010/0083077 | A1 | 4/2010 | Paulsen et al. |
| 2010/0115399 | A1 | 5/2010 | Kohar et al. |
| 2011/0082749 | A1 | 4/2011 | Rivlin et al. |
| 2011/0283210 | A1 | 11/2011 | Berger et al. |
| 2012/0036427 | A1 | 2/2012 | Osaka et al. |
| 2012/0042240 | A1 | 2/2012 | Oliveira et al. |
| 2012/0102095 | A1 | 4/2012 | Campbell et al. |
| 2012/0156314 | A1* | 6/2012 | King .................... A61K 31/365 424/725 |
| 2012/0159314 | A1 | 6/2012 | Shrier et al. |
| 2012/0179780 | A1 | 7/2012 | Spring et al. |
| 2012/0294514 | A1 | 11/2012 | Saunders et al. |
| 2012/0331548 | A1 | 12/2012 | Tseng et al. |
| 2013/0007586 | A1 | 1/2013 | Thomas |
| 2013/0024757 | A1 | 1/2013 | Doll et al. |
| 2013/0033436 | A1 | 2/2013 | Brinda et al. |
| 2013/0050250 | A1* | 2/2013 | Brinda .................. G06F 3/0488 345/619 |
| 2013/0102281 | A1 | 4/2013 | Kanda et al. |
| 2013/0124980 | A1 | 5/2013 | Hudson et al. |
| 2013/0145259 | A1 | 6/2013 | Kiefer et al. |
| 2013/0162574 | A1* | 6/2013 | Kobayashi ............ G06F 3/0488 345/173 |
| 2013/0219155 | A1* | 8/2013 | Barrus ................ G06F 9/44505 713/1 |
| 2013/0305144 | A1 | 11/2013 | Jackson et al. |
| 2014/0059498 | A1* | 2/2014 | McCormack .......... G06Q 10/06 715/854 |
| 2015/0019943 | A1 | 1/2015 | Ying et al. |
| 2015/0019958 | A1 | 1/2015 | Ying et al. |

OTHER PUBLICATIONS

United States Office Action for U.S. Appl. No. 13/187,840, dated Oct. 18, 2013, 25 pages.
United States Office Action for U.S. Appl. No. 13/187,840, dated Jun. 3, 2014, 23 pages.
PCT International Search Report and Written Opinion, PCT Application No. PCT/US2014/044979, dated Oct. 30, 2014, 9 pages.
PCT International Search Report and Written Opinion for International Application No. PCT/US2014/039402, dated Oct. 16, 2014, 17 pages.
Office Action for Chinese Patent Application No. CN 2014800294130, dated May 12, 2017, 34 Pages.
Third Office Action for Chinese Patent Application No. CN 201480029413.0, dated Aug. 16, 2017, 11 Pages.
Supplementary European Search Report for European Patent Application No. EP 14801293, dated Nov. 29, 2016, 10 Pages.
Raja, H., "How to Replace an Customize Android Lock Screen," Addictivetips.com, Jun. 10, 2011, 8 pages, Retrieved from the Internet <URL:http://www.addi cti veti ps.com/mobi1e/how-to-replace-and-customize-android-lock-screen-guide/>.
Office Action for Chinese Patent Application No. CN 2014800294130, dated Oct. 10, 2016, 16 Pages.

* cited by examiner

DYNAMIC ARRANGEMENT OF CONTENT PRESENTED WHILE A CLIENT DEVICE IS IN A LOCKED STATE

CROSS REFERENCE TO RELATED APPLICATIONS

This application claims the benefit of U.S. Provisional Application No. 61/826,944, filed May 23, 2013, which is incorporated by reference in its entirety.

BACKGROUND

This disclosure relates generally to digital magazines, and specifically relates to dynamically generating a section of a digital magazine for display on a mobile client device during a locked state using templates.

As the number of applications or content sources with which a user interacts via a client device increases, users may identify applications or content sources to readily access while the client device is in a state of reduced functionality, or a "locked state." However, limits on display size of a display device of a client device limit the amount of information from various content sources capable of being presented while the client device is in a locked state. While a user may select a content source associated with various regions of a display device, the user cannot practically choose the most interesting content from thousands of content items from the selected source for presentation on the regions of the display device. Moreover, the user is limited by the user-selected sources to discover relevant content items and is also limited in choosing how the content items are displayed. For example, when selecting information for presentation while a client device is in a locked state, a user may be limited to selecting from a limited number of sizes for display regions for presenting content while the client device is in a locked state.

SUMMARY

When a user accesses various applications via a client device, the client device may allow the user to more easily retrieve or access content from various applications by presenting content from one or more applications while the client device is in a locked state that limits the inputs the client device is capable of receiving. To increase the relevance of content presented while the client device is in the locked state, the client device selects a page template including a plurality of slots and associates content items from various applications executing on the client device with different slots. Slots in a page template identify positions of a display area in which content items are presented relative to each other.

To select a page template, the client device identifies a plurality of candidate page templates based on characteristics of the client device, such as display device size, display device resolution, geographic location of the client device, or other suitable information. Additional information, such as information associated with the user of the client device may also be used to identify the candidate page templates. A page template is selected from the candidate page templates based on characteristics of the client device, user interactions with applications executing on the client device, or any other suitable information. One or more applications executing on the client device are associated with each slot in the selected page template, so content from an application is presented in a location specified by its associated slot in the selected page template.

In various embodiments, user interaction with applications executing on the client device is used to associate applications with slots in the selected page template. For example, applications with which the user has had at least a threshold amount of interaction during a specified interval are identified, and content from one or more of the identified applications are associated with slots in the selected template. In another example, a user selects one or more applications executing on the client device via user input to the client device, and one or more of the selected applications are associated with various slots in the selected template. When the client device is in a locked state, content from the selected or identified applications is presented to the user based on the slots in the selected page template associated with various applications.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital magazine server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
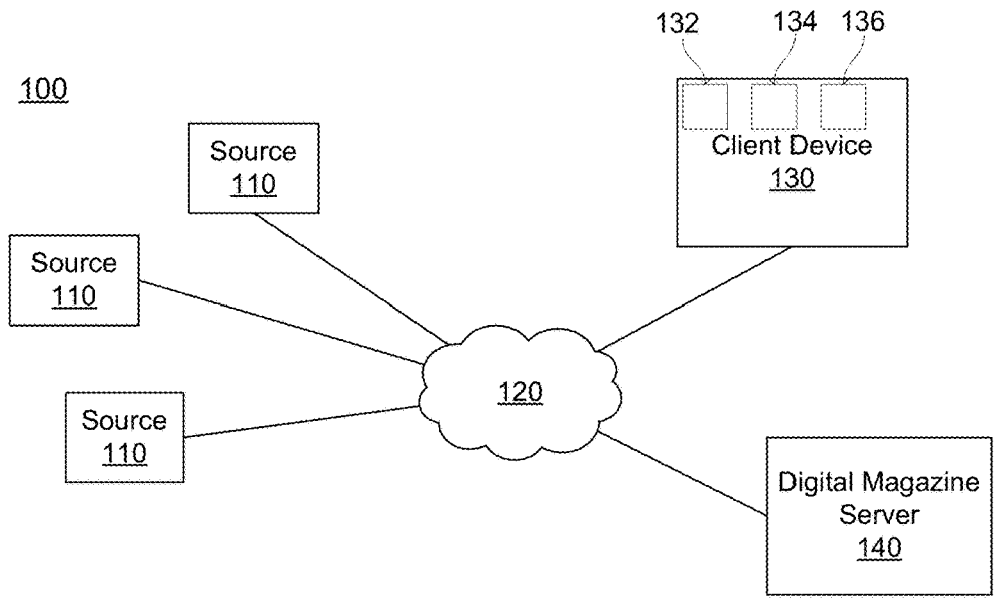
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 130 have display devices 132 with different display areas, different resolutions, or differences in other characteristics.

One or more input devices 134 included in the client device 130 receives input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device 130 may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

In some embodiments, the client device 130 includes a content selection module 136 that determines device state information associated with the client device 130 and identifies one or more characteristics of the client device 130. Based on the device state information, the content selection module 130 selects a page template from page templates stored on the client device 110, such as in the content selection module 136, and content items from one or more applications executing on the client device 130 for presentation on the display device 132 based on the selected page template. In some embodiments, the characteristics of the client device 130 are also used for selecting the page template. Example characteristics of the client device 130 include a location associated with the client device, information describing a connection between the client device 130 and the network 120, information describing user interaction with applications executing on the client device 130, and information describing movement or motion of the client device 130 (e.g., velocity, acceleration, directionality).

The device state information describes a functional or operational state of the client device 130. In one embodiment, the device state information identifies an active state, an idle state, or a limited access state (i.e., a "locked state"). While operating in the limited access state, the client device 130 accepts a reduced number of input types from a user, but allows content to be presented the user via the display device 132. For example, while operating in the locked state, the client device 130 provides the user with access to a section of a digital magazine including content items selected for the user from applications executing on the client device 130 in content regions having positions relative to each other specified by the a page template. As the page template is selected based on one of or a combination of attributes of the user, interactions of the user with applications executing on the client device 130, and characteristics of the client device 130, presentation of the content items is personalized for the user.

Each content region presenting content while the client device 130 is in a locked state the home screen is associated with one or more applications executing on the client device 130. The content selection module 136 retrieves content associated with one or more applications executing on the client device 130 and selects a page template from a set of candidate templates, as further described below in conjunction with FIG. 4. The client selection module 136 also associates a content item retrieved from an application executing on the client device 130 with a slot in the selected page template to specify a location for presenting the content item relative to content items retrieved from other applications executing on the client device 130. As described further below in conjunction with FIG. 4, the content selection module 136 presents content from various applications executing on the client device 130 in a format similar to presentation of content via a digital magazine.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
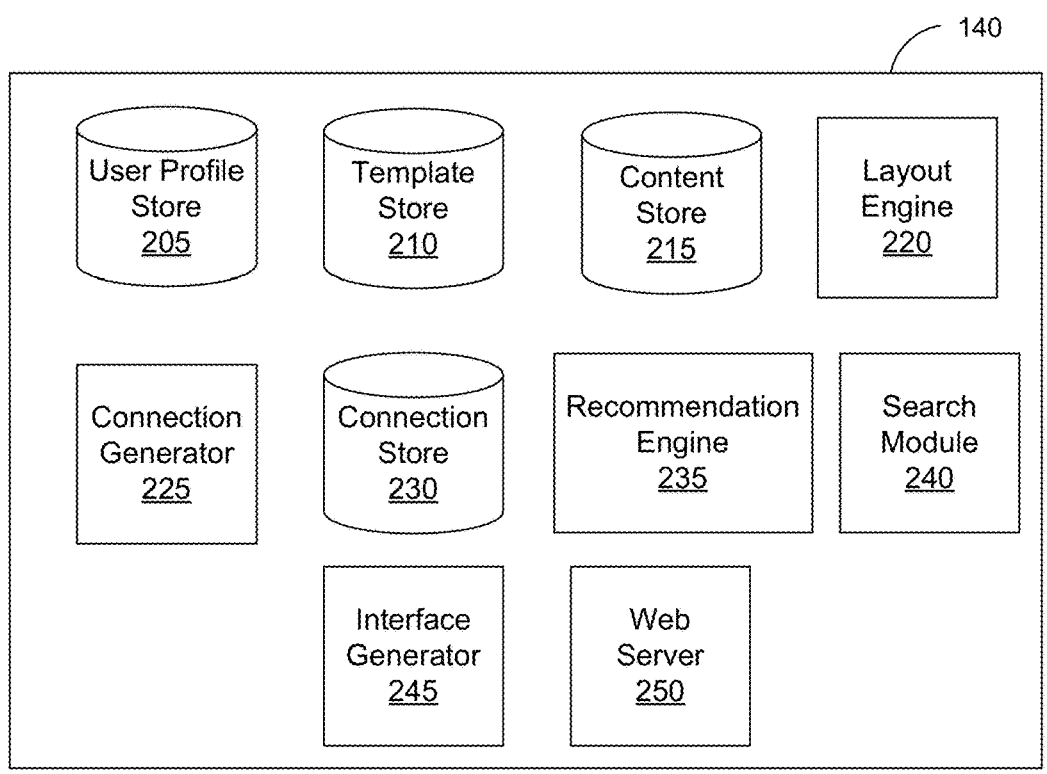
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 130.

Using data from the connection store 130, the recommendation engine 135 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking. Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, the interface generator 245 includes instructions that are communicated to a client device 130, to allow a user to interact with interface elements corresponding to content items presented while the client device 130 is in a locked state. Interactions with the interface elements presented during the locked state include one or more of using gestures, eye movement, or by modifying the position of the client device 130 to allow a user to limited access to content items and applications executing on the client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

Figure 3:
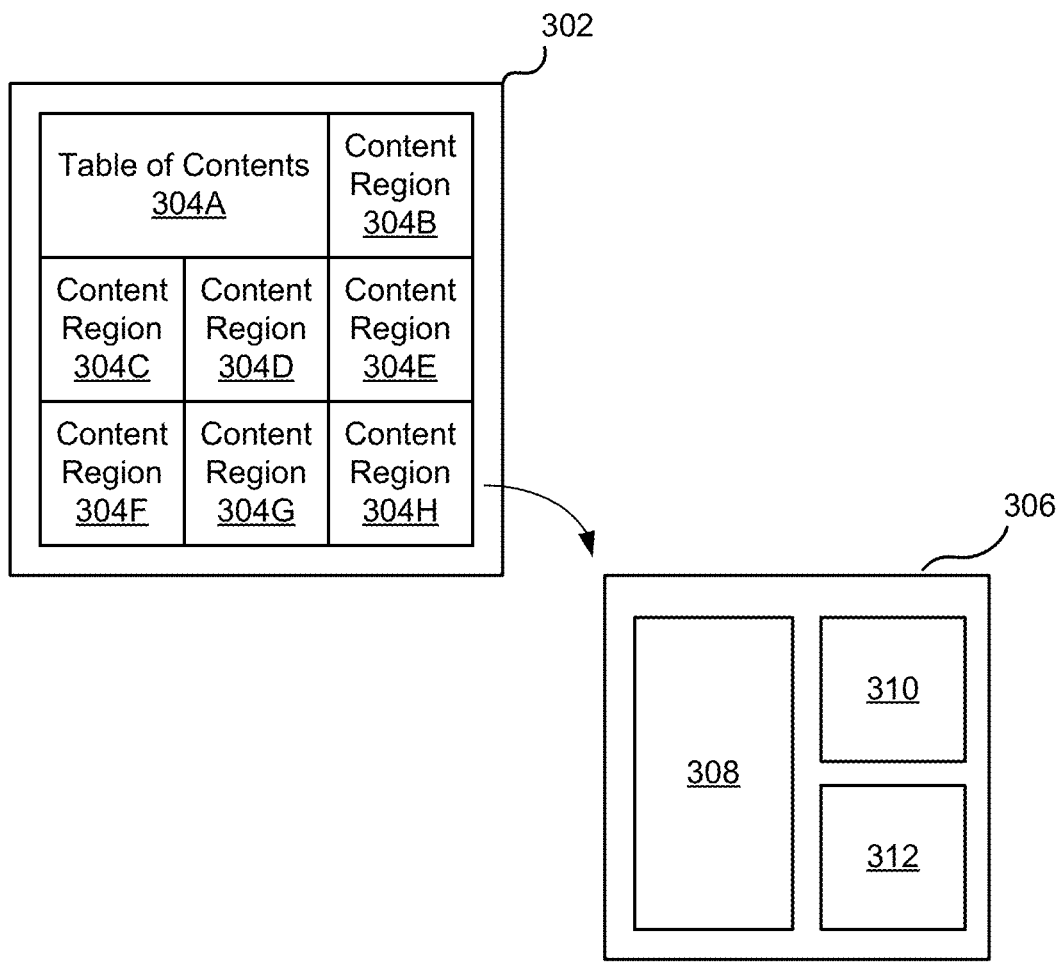
FIG. 3 is an example of presentation of content items in a digital magazine using a page template, in accordance with an embodiment of the invention.

For purposes of illustration, FIG. 3 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. In one implementation, a digital magazine application executing on the client device 130 or the content selection module 136 of the client device 130 dynamically selects content items associated with applications executing on the client device 130 and generates a page of a digital magazine for presentation on a display device 132 of the client device 130 based on a selected page template while the client device 130 is in a locked state, as further described below in conjunction with FIG. 4.

Page Templates

FIG. 3 illustrates an example page template 302 having multiple rectangular slots each configured to present a content item. Other page templates with different configurations of slots may be used by the digital magazine server 140 or by the content selection module 136 of a client device 130 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 or a content selection module 136 of a client device 130 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Alternatively, a content selection module 136 retrieves one or more page templates from the content selection module 136 and generates instructions associating content items with slots within a selected page template. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. Alternatively, information describing sections or subsections may be stored by the content selection module 136 on a client device 130. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Figure 4:
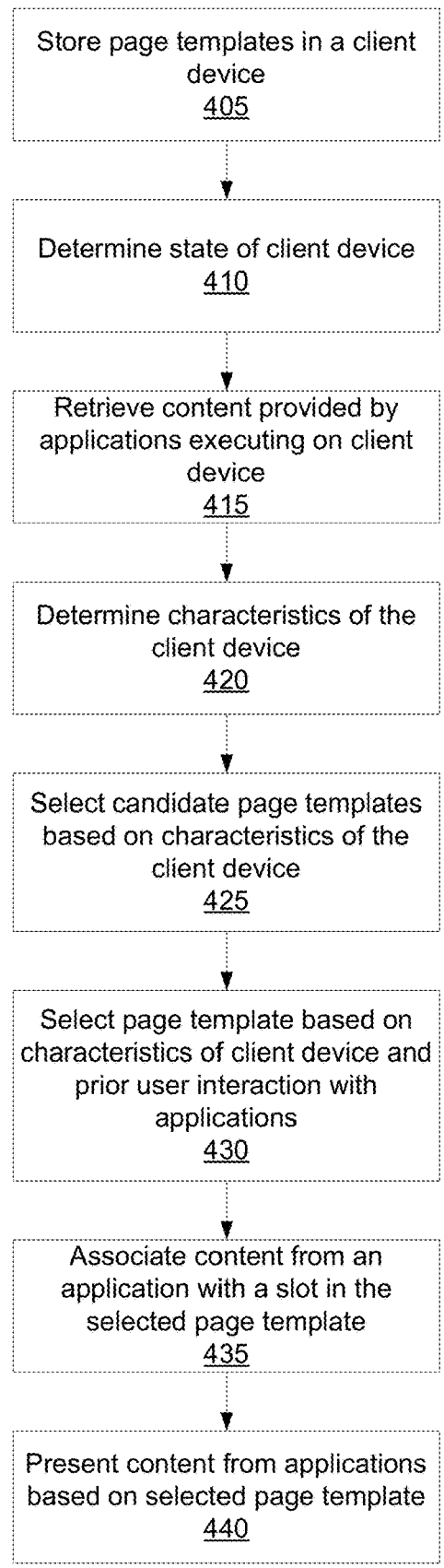
FIG. 4 is a flowchart of a method for displaying content associated with applications executing on a client device while the client device is in a locked state, in accordance with an embodiment of the invention.

Dynamic Arrangement of Content Presented while a Client Device is in a Locked State FIG. 4 is a flowchart of one embodiment of a method for displaying content from applications executing on the client device using a page template. A digital magazine application executing on a client device 130 or the content selection module 136 stores 405 one or more page templates on the client device 130. For example, one or more page templates are stored in the content selection module 136. As previously described in conjunction with FIGS. 2 and 3, a page template includes one or more slots, each configured to present one or more content items. The positions of slots relative to each other in a page template specify the positions of content regions in which content items are presented relative to each other in a page generated from the page template. Similarly, the size of a slot in a page template specifies the size of a content region in which one or more content items are presented. In some embodiments, slots in a page template may be associated with a specific type of content (i.e., content items having one or more specified characteristics). For example, a slot is associated with an application executing on the client device 130 so one or more content items associated with the application are presented in a content region corresponding to the slot.

The content selection module 136 included in the client device 130 determines 410 a device state of the client device 130 based on information obtained from least one of an operating system, an application executing on the client device 130, or one or more hardware components of the client device 130. Examples of information for determining the device state include information about an amount of interaction received via an input device 134 within a specified time interval, information describing a brightness of a display device 132 information indicating a level of power consumption of the client device 130, and one or more settings of the client device 130. In one implementation, the one or more settings of the client device 130 specify one or more conditions for a locked state of the client device 130, such as maximum time interval between received inputs with the input device 134 before the client device 130 operates in a locked state, an input or combination of inputs that configures the client device 130 into the locked state (e.g., interaction with a button or a specific gesture to transition the client device 130 into the locked state), information that, when received by the client device 130, changes the device state of the client device 130 from a locked state to an active state or another state (e.g., a password, a gesture, biometric data, or other suitable information that changes the device state from a locked state to another state when received).

Responsive to determining 410 the client device 130 is in a locked state, the client device 130 retrieves 415 content items associated with one or more applications executing on the client device 130. For example, if the client device 130 is determined 410 to be in a locked state and an input is received while the client device 130 is in the locked state, content items associated with one or more applications executing on the client device are retrieved 415. In one embodiment, the client device 130 accesses a registry or other listing of applications executing on the client device 130 and retrieves 415 content items associated with one or more of the applications. For example, the client device 130 retrieves 415 content items associated with applications in a set or group identified by one or more inputs received from a user of the client device 130. Alternatively, the client device 130 retrieves 415 content items associated with applications with which the user has at least a threshold frequency of interaction or with which the user has performed at least a threshold amount of interaction during a specified time interval. Other information may be used when identifying applications from which content items are retrieved 415. Examples of other information include, a geographic location of the client device 130, a geographic location specified by the user, a time of day, characteristics of the client device 130, information associated with the user by various applications executing on the client device 130 (e.g., interactions between the user and content provided by various applications), and user information provided to the client device 130 by the digital magazine server 140. Examples of user information provided to the client device 130 by the digital magazine server 140 include biographical information, connections between the user and additional users of the digital magazine server 140, interactions between the user and other users of the digital magazine server 140, interactions between the user and content provided by the digital magazine server 130, and other suitable information.

In one embodiment, the set of applications from which content items are retrieved 415 modified over time. For example, applications executing on the client device 130 are ranked based on an amount of user interaction with each application during a specified time interval, and content items are retrieved 415 from applications having at least a threshold position in the ranking. The ranking of applications executing on the client device 130 may also account for additional factors, such as geographic information associated with the client device, user information, or one or more attributes of content items provided by an application. Examples of an attribute of a content item include a type of a content item (e.g., image, notification, calendar item, message, post, etc.), an age of a content item, an author of a content item, subject matter of a content item, and a size of a content item. Additional examples of an attribute of a content item include an indication of the content item's popularity among users of an application from which the content item was retrieved 415 or a quality indicator associated with the content item. A quality indicator may provide an indication of the quality of an image associated with a content item, a number of images included in a content item, a number of times a keyword about a topic appears in a content item, or other suitable information providing an indication of an amount of interaction with a content item.

Examples of content items retrieved 415 from applications executing on the client device 130 include an image from a cloud-based storage application, an image of a map from a mapping application, a message from a messaging or e-mail application, and current local weather conditions from a weather forecasting application. In one embodiment, an application specifies one or more content items for retrieval by the client device 130 (e.g., by the content selection module 136). In another embodiment, a request is communicated to an application executing on the client device 130 that specifies one or more content item selection criteria for identifying content items to retrieve 415. The selection criteria may be based on information describing user interaction with the client device 130, characteristics of the client device 130, or any other suitable information. For example, the content selection module 136 determines that the user associated with a client device 130 is more than a threshold distance away from a home location specified by the user based on a calendar entry from a calendar application or e-mail application or based on location information from a location sensor included in the client device 130 and a home location included in a user profile maintained by an application executing on the client device 130. If the client device 130 location is greater than a threshold distance from the home location, the content item selection criteria specifies content items related to the current location of the client device 130, such as whether, entertainment venues, language translation, posts related to the current location from users of a social networking system application that are connected to the user of the client device 130 via a social networking system, or content items from the digital magazine server 140 associated with the current location of the client device 130. More generally, the content item selection criteria may use information associated with the user of the client device 130 received from the digital magazine server 140 or obtained from one or more applications executing on the client device 130, attributes of the client device 130, location information of the client device 130, time of day, or other information accessible using the client device 130 to retrieve 415 content items from one or more applications executing on the client device 130.

Additionally, one or more characteristics of the client device 130 are determined 420 and used to select 425 one or more candidate page templates stored on the client device 130. In one embodiment, the content selection module 136 determines 420 one or more characteristics of the client device 130 by exchanging information with the operating system, with one or more applications executing on the client device 130, or with other hardware and/or software components of the client device 130. In other embodiments, the content selection module 136 determines one or more characteristics of the device based on information provided by a computing system external to the client device 130. Example characteristics of the client device 130 include physical dimensions of a display device 132 of the client device 130, a resolution of the display device 132 of the client device 130, information describing a connection between the client device 130 and a network 120, or other suitable information.

Based at least in part on the characteristics of the client device 130, one or more candidate page templates are selected 425 from the stored page templates. For example, physical dimensions corresponding to slots in various stored page templates are determined; page templates having at least one slot having one or more physical dimensions less than a threshold value are not selected 425 as candidate page templates. Hence, page templates that would present content items using dimensions that would make viewing or interacting with the content items difficult are not selected 425 as candidate page templates. As another example, various page templates partition a display area of a display device 132 into one or more columns, and each of the various page templates is compared to information about the display area of the display device 132. The columns may be specified using percentages of the display area or using specified physical dimensions. Page templates having a number of columns capable of being presented in the display area of the display device 132 with at least a threshold physical size are selected 425 as candidate page templates, while page templates having one or more columns not capable of being presented in the display area with at least the threshold physical size are not selected 425 as candidate page templates. For example, a display area of the display device 132 may be unable to present more than 5 columns each having at least a threshold physical size, so page templates including more than 5 columns are not selected 425 as candidate page templates, while page templates with 5 or fewer columns are selected 425 as candidate page templates. Additionally, one or more user preferences or settings may be used when selecting 425 the one or more page templates. For example, a user may store one or more settings on the client device 130 specifying a number of content regions to display when the client device 130 is in a locked state, a minimum size of content regions displayed when the client device 130 is in a locked state, or other suitable information describing presentation of content items while the client device 130 is in a locked state. In these examples, candidate page templates are selected 425 as page templates satisfying at least a threshold number of settings specified by the user as well as characteristics of the client device.

A page template is selected 420 from the candidate page template. In one implementation, the candidate page templates are scored based at least in part on the characteristics of the client device 130. For example, slots in a candidate page template are scored based on their sizes relative to the size of the display device 132 of the client device 130. In another implementation, candidate page templates are scored based at least in part on the characteristics of the client device 130 and characteristics of the content items from one or more applications executing on the client device 130. For example, candidate page templates are scored based on when content items from one or more applications executing on the client device 130 for presentation via a candidate page template were received by the client device 130, a date or time associated with content items to be presented via a candidate page template, or other suitable indication of content item age. Based on the scores of the candidate page templates, a page template is selected 430 from the candidate page templates. For example, a page template having a maximum score is selected 430. Alternatively, a page template having at least a threshold score is selected 430. An example of scoring page candidate page templates is further described in U.S. patent application Ser. No. 13/938,227, filed on Jul. 9, 2013, and U.S. patent application Ser. No. 13/938,226, filed on Jul. 9, 2013, each of which is hereby incorporated by reference in its entirety. Types of content items and associations between slots in a candidate page template and types of content items may also influence the score of the candidate page template. An example of accounting for associations between types of content items and slots in a candidate page template is further described in U.S. patent application Ser. No. 13/187,840, filed on Jul. 21, 2011, which is hereby incorporated by reference in its entirety.

The client device 130 associates 435 content from an application executing on the client device 130 with various slots in the selected page template to specify the relative sizing and positioning of content items associated with various applications when presented to the user. In various embodiments, the client device 130 accounts for associations between slots and types of content items when associating 435 content from applications with slots of the selected page template. For example, content associated with specific types of applications is associated 435 with one or more slots of the selected page template, allowing the selected page template to specify the sizing and orientation of content from various applications relative to each other. Additionally, content from an application executing on the client device 130 may be associated 435 with a slot in the selected page template based on one or more specified characteristics of content from the application. An example of using a page template to present content items is further described in U.S. patent application Ser. No. 13/187,840, filed on Jul. 21, 2011, which is hereby incorporated by reference in its entirety.

In one embodiment, the content selection module 136 assigns a type to one or more of the content items provided by applications executing on the client device 130. For example, types identify a characteristic of an application from which a content item was retrieved. Example types include a type associated with a social networking application, a type associated with a messaging application, a type associated with a calendar application, a type associated with a navigation application, a type associated with a weather application, a type associated with an e-mail client, a type associated with a digital magazine application, or another suitable type. In one implementation, the client device 130 converts content items provided by various applications executing on the client device 130 into a standardized format where each content item is associated with a type according to one or more specified rules. Using the types associated with various content items, the client device 130 associates 435 slots in a selected page template with various content items. For example, a most recent section from a digital magazine is associated 435 with a slot in the selected page template that is associated with a type associated with a digital magazine application, while a text message from a messaging application is associated 435 with a slot in the selected page template associated with a type associated with a messaging application.

Using the selected page template and associations between content from various applications executing on the client device 130 with slots in the selected page template, the client device 130 presents 440 content from one or more of the applications while the client device 130 is in a locked state. The presented content includes content regions each presenting content associated with one or more applications in locations relative to each other specified by the slots in the selected page template. Additionally, the sizes of various content regions are determined from the sizes of corresponding slots in the selected page template. Hence, the client device 130 dynamically arranges and sizes content from various applications executing on the client device 130 for presentation 440 while the client device 130 is in a locked state by selecting 430 a page template.

In one embodiment, a size of a content region presenting 440 content is modified based on the location of the content region within the display device 132 or if the content region presents a content item having a specified type. An example of modifying the size of a content region based on the location of the content region within a display device 132 is further described in U.S. patent application Ser. No. 13/938, 226, filed on Jul. 9, 2013, which is hereby incorporated by reference in its entirety. In one embodiment, after presenting 440 content while the client device 130 is in a locked state, dimensions of the display device 132 may be modified. For example, the display device 132 may transition from a portrait orientation to a landscape orientation or vice versa. Accordingly, the client device 130 may select 430 an alternative page template accounting for the dimensions of the display device 132 in the alternative orientation and associate 435 content from various applications with slots in the alternative page template, allowing the client device 130 to dynamically modify presentation of content while in the locked state 130 based on changes in client device orientation 130. An example of modifying the size of a content region based on changes in available display area is further described in U.S. patent application Ser. No. 13/938,226, filed on Jul. 9, 2013, which is hereby incorporated by reference in its entirety.

In one embodiment, the client device 130 associates 435 content with slots in the selected page template at periodic intervals or based on received user input. This allows the client device 130 to modify the content presented 440 using the selected page template over time. Content associated with different slots of the selected page template may be modified at different rates. In some embodiments, the rate at which content associated with a slot is modified is based at least in part on a frequency or amount of user interaction with the application associated with content associated with the slot. For example, content associated with a slot associated with an application with which the user has a greater frequency of interaction is modified more frequently than content associated with a slot associated with an additional application with which the user has a lower frequency of interaction. Having a frequency with which content associated with a slot is modified proportional to the frequency with which the user interacts with an application associated with the slot increases the likelihood of the content presented while the client device 130 is in a locked state being relevant to the user. In some embodiments, the client device 130 updates the layout and content presented while the client device 130 is in a locked state to allow a user to more easily explore content items from a set, or space, of applications executing on the client device 130. In another example, the client device 130 modifies the layout of content items relative to each other when the client device 130 is in a locked state and/or content presented while the client device 130 is in a locked state based on location information associated with the client device 130 (e.g., location, time of day) or information associated with the user.

Presenting Content while a Client Device is in a Locked State

Figure 5A:
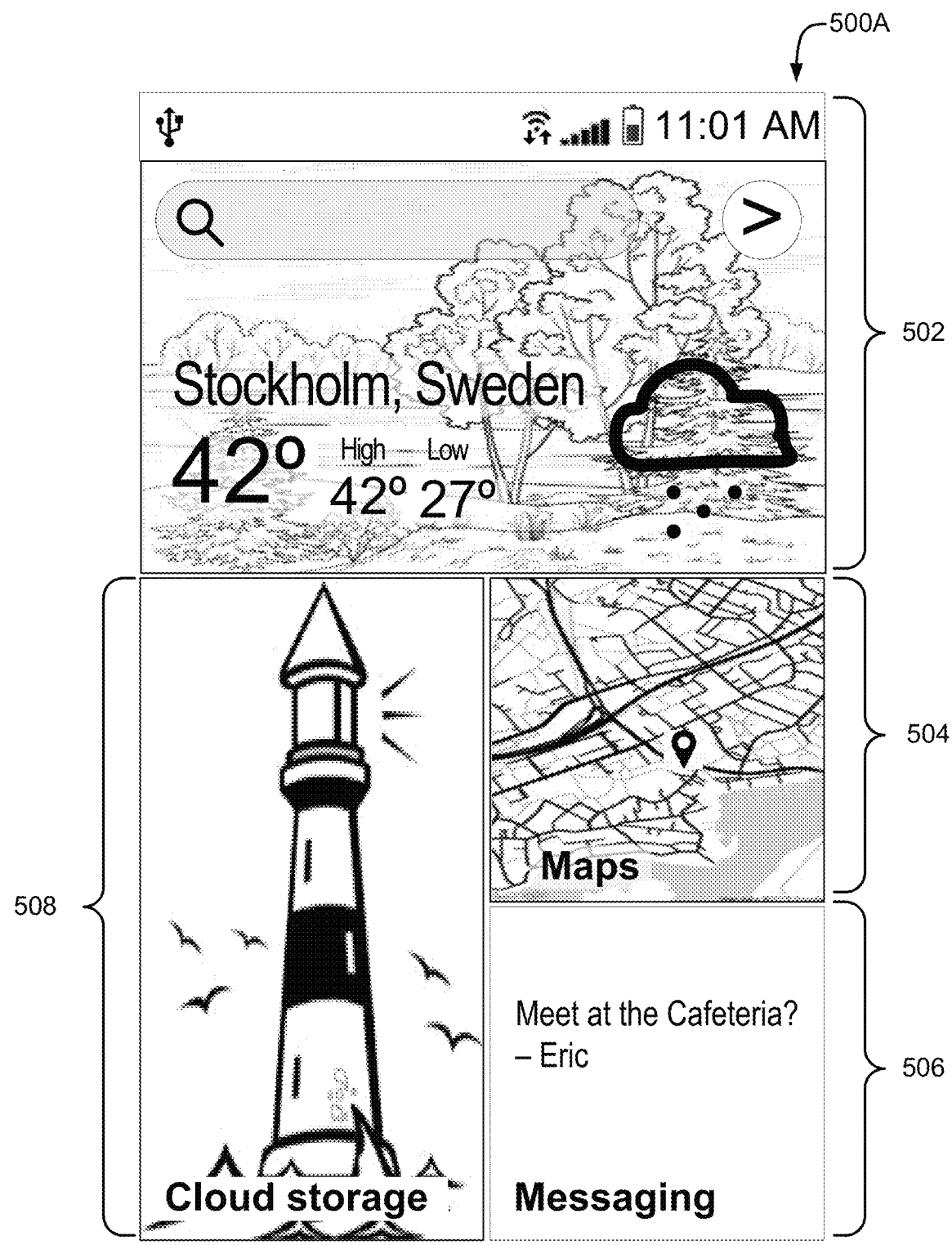
FIG. 5A is an example of a user interface for displaying content associated with applications executing on a client device while the client device is in a locked state, in accordance with an embodiment of the invention.

To improve user interaction with content from various applications executing on a client device 130 while the client device 130 is in a locked state, FIG. 5A shows one embodiment of a user interface 500 presented while the client device 130 is in a locked state. The user interface 500A shown in FIG. 5A includes content associated with various applications executing on a client device 130 oriented relative to each other according to the method described above in conjunction with FIG. 4, allowing a user to more readily interact with content while the client device 130 is in a locked state. In the example of FIG. 5A, the user interface 500 includes content regions 502, 504, 506, and 508, which each include content associated with one or more applications executing on the client device 130. As shown in FIG. 5A, the content items presented in locations relative to each other determined by slots in a page template as further described above in conjunction with FIG. 4.

Figure 5B:
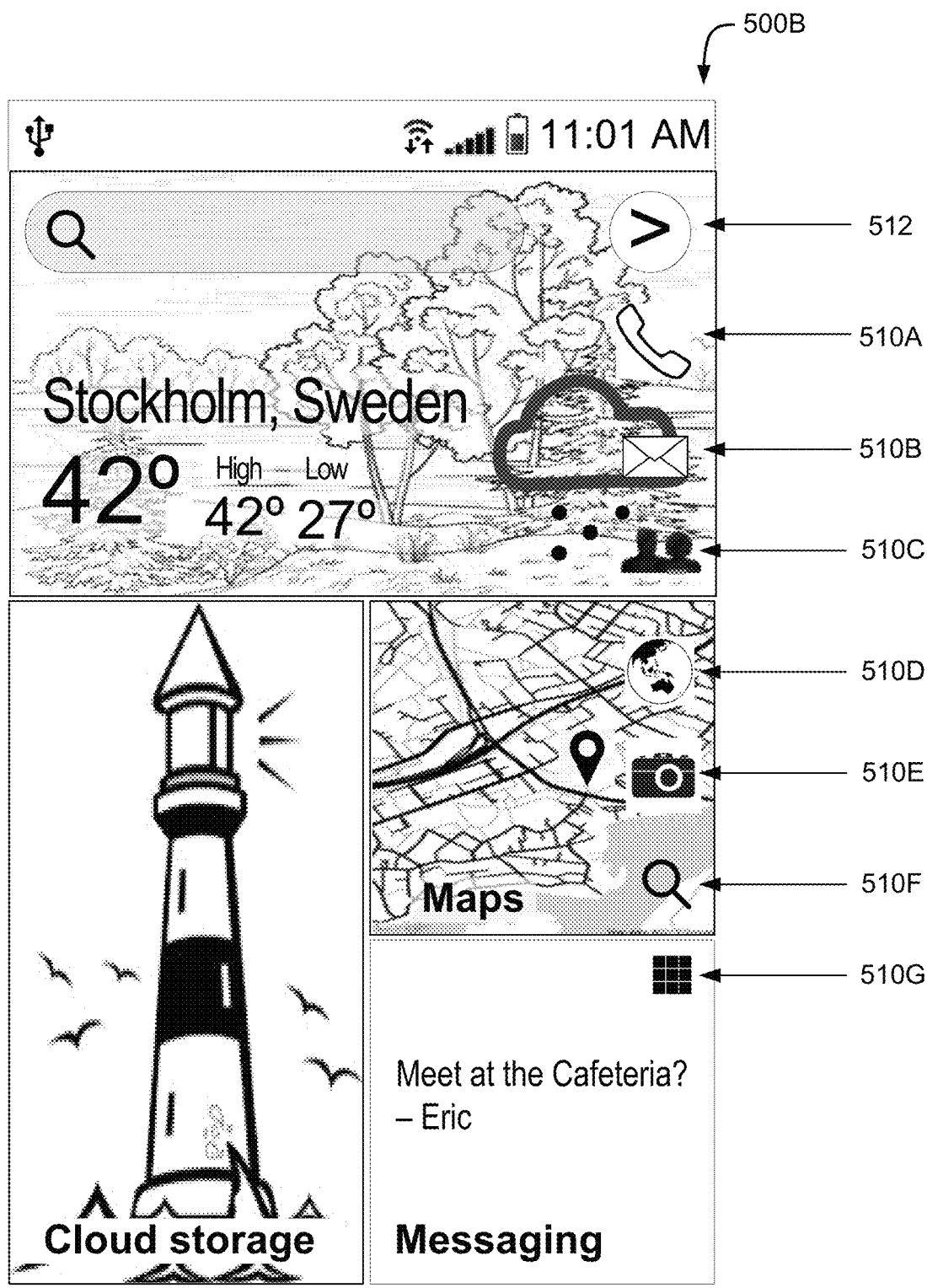
FIG. 5B is another example of a user interface for displaying content associated with applications executing on a client device while the client device is in a locked state, in accordance with an embodiment of the invention.

FIG. 5B shows another example of a user interface 500B presenting content from various applications executing on a client device 130 while the client device 130 is in a locked state along with interface elements 510A-510G associated with applications executing on the client device 130. As shown in FIG. 5B, the interface elements 510A-510G are overlaid on the content from various applications executing on the client device 130 while the client device is in a locked state to allow a user of the client device 130 to more easily access applications associated with various interface elements 510A-510G. This allows the user to view content items while the client device 130 is in a locked state while also simplifying access to applications executing on the client device 130 via the interface elements 510A-510G. In some embodiments, the content selection module 136 executing on the client device 130 displays or hides the interface elements 510A-510G based on one or more inputs received from a user. For example, the user interacts with an access element 512 presented by the user interface 500B to display the interface elements 510A-510G when the interface elements 510A-510G are not displayed and interacts with the access element 512 to hide the interface elements 510A-510G when the interface elements 510A-510G are displayed. In other embodiments, any suitable input may be received to display or conceal the interface elements 510A-510G. Additionally, the user may select one or more interface elements 510A-510G for presentation or specify applications associated with various interface elements 510A-510G to customize the information presented while the client device 130 is in a locked state.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
storing a plurality of page templates in a client device, each page template including one or more slots, each slot specifying a content region in which a content item provided by an application executing on the client device and specifying a position of the content region specified by a slot relative to other slots and a size of the content region specified by the slot;
determining the client device is in a locked state;
retrieving content provided by one or more applications executing on the client device responsive to determining the client device is in the locked state;
determining one or more characteristics of the client device comprising a location of the client device and information describing user interaction with applications executing on the client device;
selecting one or more candidate page templates from the plurality of page templates based on the characteristics of the client device including the location of the client device, information describing user interaction with applications executing on the client device, and one or more settings stored on the client device specifying a number of content regions to display when the client device is in the locked state, each candidate page template having a number of slots satisfying the specified number of content regions to display when the client device is in the locked state;
generating a score associated with each of the one or more candidate page templates, a score associated with a candidate page template based on a size of the display area of the client device, a relative size of each slot of the candidate page template to the size of the display area of the client device, times when content items from one or more applications executing on the client device to be presented by the candidate page template were received by the client device, dimensions of slots included in the candidate page template, associations between slots included in the candidate page template and types of content, where a type of content identifies a characteristic of an application executing on the client device from which the content was retrieved, and characteristics of the retrieved content;
selecting, by the client device, a page template from the one or more candidate page templates having a maximum generated score;
associating content from one or more applications executing on the client device with each slot in the selected page template, different slots in the selected page template associated with different types of content, the type of content identifying the characteristic of the application executing on the client device from which the content was retrieved; and
presenting the content from the one or more applications executing on the client device in positions relative to each other based on the selected page template while the client device is in the locked state via the display area of the client device, a size of at least one content region modified relative to a corresponding slot in the selected page template based on a location of the at least one content region within the display area and content presented in positions corresponding to different slots in the selected page template modified at different rates that are proportional to frequencies with which the user interacts with applications from which content presented in positions corresponding to different slots were retrieved.

2. The method of claim 1, wherein associating content from one or more applications executing on the client device with each slot in the selected page template comprises:
   determining a type associated with content from an application executing on the client device; and
   associating content from the application executing on the client device with a slot in the selected page template based at least in part on the determined type.

3. The method of claim 2, wherein the type associated with content from the application describes a characteristic of the application.

4. The method of claim 1, wherein associating content from one or more applications executing on the client device with each slot in the selected page template comprises:
   selecting content items associated with one or more applications executing on the client device based at least in part on location information associated with each content item and the location associated with client device; and
   associating one or more of the selected content items with each slot in the selected page template.

5. The method of claim 1, wherein the characteristics of the client device comprise a size of the display area of a client device.

6. The method of claim 1, wherein associating content from one or more applications executing on the client device with each slot in the selected page template comprises:
   selecting a set of applications executing on the client device based at least in part on an amount of user interaction with each application during a specified time interval; and
   associating content with each application in the selected set of applications with a slot in the selected page template.

7. The method of claim 6, wherein selecting the set of applications executing on the client device comprises:
   selecting one or more applications executing on the client device with which the user had at least a threshold amount of interaction during the specified time interval.

8. The method of claim 1, wherein associating content from one or more applications executing on the client device with each slot in the selected page template comprises:
   selecting a set of applications identified based on one or more inputs received by the client device from the user; and
   associating content with each application in the selected set of applications with a slot in the selected page template.

9. A computer program product comprising a non-transitory computer-readable storage medium having instructions encoded thereon that, when executed by a processor, cause the processor to:
   store a plurality of page templates in a client device, each page template including one or more slots, each slot specifying a content region in which a content item provided by an application executing on the client device and specifying a position of the content region specified by a slot relative to other slots and a size of the content region specified by the slot;
   determine the client device is in a locked state;
   retrieve content provided by one or more applications executing on the client device responsive to determining the client device is in the locked state;
   determine one or more characteristics of the client device comprising a location of the client device and information describing user interaction with applications executing on the client device;
   select one or more candidate page templates from the plurality of page templates based on the characteristics of the client device including the location of the client device, information describing user interaction with applications executing on the client device, and one or more settings stored on the client device specifying a number of content regions to display when the client device is in the locked state, each candidate page template having a number of slots satisfying the specified number of content regions to display when the client device is in the locked state;
   generate a score associated with each of the one or more candidate page templates, a score associated with a candidate page template based on a size of the display area of the client device, a relative size of each slot of the candidate page template to the size of the display area of the client device, times when content items from one or more applications executing on the client device to be presented by the candidate page template were received by the client device, dimensions of slots included in the candidate page template, associations between slots included in the candidate page template and types of content, where a type of content identifies a characteristic of an application executing on the client device from which the content was retrieved, and characteristics of the retrieved content;
   select a page template from the one or more candidate page templates having a maximum generated score;
   associate content from one or more applications executing on the client device with each slot in the selected page template, different slots in the selected page template associated with different types of content, the type of content identifying the characteristic of the application executing on the client device from which the content was retrieved; and
   present the content from the one or more applications executing on the client device in positions relative to each other based on the selected page template while the client device is in the locked state via the display area of the client device, a size of at least one content region modified relative to a corresponding slot in the selected page template based on a location of the at least one content region within the display area and content presented in positions corresponding to different slots in the selected page template modified at different rates that are proportional to frequencies with which the user interacts with applications from which content presented in positions corresponding to different slots were retrieved.

10. The computer program product of claim 9, wherein associate content from one or more applications executing on the client device with each slot in the selected page template comprises:
   determine a type associated with content from an application executing on the client device; and
   associate content from the application executing on the client device with a slot in the selected page template based at least in part on the determined type.

11. The computer program product of claim 10, wherein the type associated with content from the application describes a characteristic of the application.

12. The computer program product of claim 9, wherein associate content from one or more applications executing on the client device with each slot in the selected page template comprises:
- select content items associated with one or more applications executing on the client device based at least in part on location information associated with each content item and the location associated with client device; and
- associate one or more of the selected content items with each slot in the selected page template.

13. The computer program product of claim 9, wherein the characteristics of the client device comprise a size of the display area of a client device.

14. The computer program product of claim 9, wherein associate content from one or more applications executing on the client device with each slot in the selected page template comprises:
- select a set of applications executing on the client device based at least in part on an amount of user interaction with each application during a specified time interval; and
- associate content with each application in the selected set of applications with a slot in the selected page template.

15. The computer program product of claim 14, wherein select the set of applications executing on the client device comprises:
- select one or more applications executing on the client device with which the user had at least a threshold amount of interaction during the specified time interval.

16. The computer program product of claim 9, wherein associate content from one or more applications executing on the client device with each slot in the selected page template comprises:
- select a set of applications identified based on one or more inputs received by the client device from the user; and
- associate content with each application in the selected set of applications with a slot in the selected page template.

* * * * *

UNITED STATES PATENT AND TRADEMARK OFFICE
CERTIFICATE OF CORRECTION

PATENT NO. : 10,621,274 B2
APPLICATION NO. : 14/286892
DATED : April 14, 2020
INVENTOR(S) : Marcos Weskamp et al.

Page 1 of 1

It is certified that error appears in the above-identified patent and that said Letters Patent is hereby corrected as shown below:

In the Claims

Column 21, Claim 4, Lines 25-26: delete "with client device;" and insert --with the client device;--

Column 23, Claim 12, Line 11: delete "with client device;" and insert --with the client device;--

Signed and Sealed this
Twenty-fourth Day of November, 2020

Andrei Iancu
*Director of the United States Patent and Trademark Office*